(12) United States Patent
Ikeda et al.

(10) Patent No.: US 7,563,121 B2
(45) Date of Patent: Jul. 21, 2009

(54) DISCHARGE TUBE CONNECTOR

(75) Inventors: Masahiro Ikeda, Tokyo (JP); Hideaki Konno, Tokyo (JP)

(73) Assignee: Polymatech Co., Ltd., Tokyo (JP)

( * ) Notice: Subject to any disclaimer, the term of this patent is extended or adjusted under 35 U.S.C. 154(b) by 0 days.

(21) Appl. No.: 12/003,327

(22) Filed: Dec. 21, 2007

(65) Prior Publication Data

US 2008/0160822 A1 Jul. 3, 2008

(30) Foreign Application Priority Data

Dec. 28, 2006 (JP) .............................. 2006-356185
Nov. 6, 2007 (JP) .............................. 2007-289061

(51) Int. Cl.
*H01R 13/62* (2006.01)

(52) U.S. Cl. ...................................................... 439/366
(58) Field of Classification Search ................ 439/366, 439/326, 242, 243; 362/221, 315
See application file for complete search history.

(56) References Cited

U.S. PATENT DOCUMENTS

| 4,376,363 A * | 3/1983 | Russell ............................ 53/52 |
| 5,050,044 A | 9/1991 | Shibayama |
| 5,860,730 A * | 1/1999 | Hesprich ...................... 362/640 |
| 2006/0279957 A1 | 12/2006 | Kwon et al. |
| 2008/0101060 A1* | 5/2008 | Hahn et al. .................... 362/198 |

FOREIGN PATENT DOCUMENTS

| JP | 05-165085 A | 6/1993 |
| JP | 08-297312 A | 11/1996 |
| JP | 09023049 | 1/1997 |
| KR | 100645360 | 11/2006 |
| WO | WO2007/142389 | 12/2007 |

OTHER PUBLICATIONS

Search Report for European Patent App. No. 07024465.2 (Sep. 3, 2008).

* cited by examiner

*Primary Examiner*—Jean F Duverne
(74) *Attorney, Agent, or Firm*—Cermak Kenealy Vaidya & Nakajima LLP; Tomoko Nakajima

(57) ABSTRACT

The present invention Provides a discharge tube connector which suppresses the occurrence of a damage of a discharge tube at the time of installation and can be easily installed. An end electrode of the discharge tube and a board electrode on a circuit board can be electrically connected with each other through a conductive connection portion without using lead wires, so a damage such as a crack and the like, of a light-emitting portion of the discharge tube can be avoided. When a holding portion is made of a rubber-like elastic material, the conductive connection portion has rubber-like elasticity, so the conductive connection portion can be pressed between the end electrode and the board electrode on the circuit board to conductively connect the end electrode with the board electrode. Therefore, the soldering operation can be omitted. Thus, installation does not take time, so a manufacturing cost can be reduced.

21 Claims, 12 Drawing Sheets

DISCHARGE TUBE CONNECTOR

BACKGROUND OF THE INVENTION

1. Field of the Invention

The present invention relates to a discharge tube connector for conductively connecting a discharge tube such as a flash discharge tube with a circuit board and holding the connected discharge tube and the circuit board.

2. Description of the Related Art

Most of illumination devices include a discharge tube as a light source. For example, a flash device used for camera photography includes a circuit board, a straight-tube-shaped flash discharge tube, and a reflecting plate. Light emitted from the flash discharge tube is focused by the reflecting plate to irradiate a subject with the light. A conventional example of the flash device will be specifically described with reference to FIG. 25. In the flash device, end electrodes 2a extending as pin terminals from a light-emitting portion 2b of a flash discharge tube 1 are fitted into a reflecting plate 3 provided so as to surround the flash discharge tube 1 to hold the end electrodes 2a. Lead wires 4 extending from the end electrodes 2a are electrically connected with board electrodes 5a on a circuit board 5 by soldering. At the time of light emission, high voltage is generated by a circuit (not shown) formed to the circuit board 5 to apply voltage of 280 V to 330 V between the end electrodes.

Because the high voltage is applied to the flash discharge tube 1, the lead wires 4 have a large wire diameter and high rigidity. Therefore, when the lead wires 4 are in contact with the circuit board 5 or the like in a case where the flash discharge tube 1 is to be installed to the flash device, the lead wires 4 do not deform. Thus, there is a problem that the impact of contact directly transfers to the flash discharge tube 1 to cause a damage such as a crack to the light-emitting portion 2b of the flash discharge tube 1. In order to solve such a problem, according to the invention described in, for example, JP 05-165085 A, the lead wires are eliminated and elastic metal plates are brought into contact with electrodes to electrically connect the electrodes with a circuit board. According to the invention described in JP 08-297312 A, the lead wires are eliminated and electrodes are held by plate terminals, each of which has a hook-shaped cut portion, to electrically connect the electrodes with a circuit board.

In the inventions described above, the lead wires are not used to suppress the occurrence of a damage such as a crack to the light-emitting portion 2b of the flash discharge tube 1. However, in the invention described in JP 05-165085 A, it is necessary to solder the elastic metal plates connected with the electrodes to the circuit board. Further, in the invention described in JP 08-297312 A, it is necessary to solder the electrodes to the plate terminals. Such soldering operations take time and effort. Therefore, although the damage of the flash discharge tube 1 can be reduced, an installation operation is difficult.

SUMMARY OF THE INVENTION

The present invention has been made in view of the above-mentioned circumstances. That is, an object of the present invention is to provide a discharge tube connector, which suppresses an occurrence of a damage of a discharge tube at the time of installation, and can be easily installed.

In order to achieve the above-mentioned object, the present invention provides a discharge tube connector mounted to a discharge tube including a light-emitting portion and an end electrode extending from an end portion of the light-emitting portion, for connecting the end electrode with a board electrode of a circuit board, including: a holding portion mounted to a first end portion of the discharge tube, in which the holding portion includes a conductive connection portion for conductively connecting the end electrode with the board electrode.

The discharge tube connector includes the holding portion mounted to the first end portion of the discharge tube and the holding portion has the conductive connection portion for conductively connecting the end electrode with the board electrode, so the end electrode and the circuit board can be electrically connected with each other without using lead wires. Therefore, a damage such as a crack to the light-emitting portion of the discharge tube is not caused by an impact transferred from lead wires. A conventional discharge tube including lead wires is subjected to a bending process in order to connect the lead wires with circuits on the circuit board when the discharge tube is installed to a device. At this time, a bending load is applied to the light-emitting portion of the discharge tube, so it is more likely to break the light-emitting portion. Unlike such a conventional technique, the lead wires are not used in the present invention. Therefore, the discharge tube can be installed to the device without applying the bending load to the light-emitting portion and performing soldering.

The holding portion may include a molding of a rubber-like elastic material. Because the holding portion is the molding of the rubber-like elastic material, the light-emitting portion made of a low-brittleness material such as glass can be flexibly held and an impact applied to the discharge tube can be absorbed by a cushioning action of the rubber-like elastic material. Therefore, for example, the breaking of the discharge tube can be prevented and the occurrence of poor contact between the end electrode and the board electrode which is caused by an impact can be prevented. Even when the discharge tube is installed, the holding portion is easily deformed, so the discharge tube can be engaged with the discharge tube connector without the application of an excessive force. Therefore, a damage to the light-emitting portion of the discharge tube at the time of installation is suppressed.

The conductive connection portion also has rubber-like elasticity. Therefore, when the end electrode of the discharge tube is pressed against the conductive connection portion, the connection between the discharge tube and the conductive connection portion can be sufficiently endured and the influence of an excessive force on the light-emitting portion of the discharge tube can be reduced. A soldering operation can be omitted, so installation does not take time. Thus, manufacturing is easy and a manufacturing cost can be reduced.

The conductive connection portion may be made of a conductive material in which magnetic conductive materials are aligned in a conductive connection direction. Because the conductive connection portion is made of a conductive material in which magnetic conductive materials are aligned in a conductive connection direction, it is possible to obtain a discharge tube connector including the conductive connection portion whose size is small but alignment property is excellent.

In the discharge tube connector, the conductive connection portion may include a contact surface of the conductive connection portion to contact with the end electrode which is provided to protrude higher than a surface around the conductive connection portion. Because the contact surface of the conductive connection portion to contact with the end electrode is provided to protrude higher than a surface around the conductive connection portion, when the end electrode of the discharge tube is strongly pressed against the conductive connection portion, conductive connection between the end electrode and the conductive connection portion can be reliably ensured.

In the discharge tube connector, the holding portion may include a pressing protrusion for increasing a contact pressure between the conductive connection portion and the end electrode in a conductive connection direction. Because the holding portion includes the pressing protrusion for increasing the contact pressure between the conductive connection portion and the end electrode in the conductive connection direction, when a pressure for holding the discharge tube connector is applied to the pressing protrusion, the pressing protrusion is pressed to increase a pressing force between the discharge tube and the conductive connection portion, so the conductive connection between the conductive connection portion and the end electrode can be further reliably realized.

In the discharge tube connector, the holding portion may include an engaging surface portion to be engaged with an outer circumferential surface of the light-emitting portion of the discharge tube. Because the holding portion includes the engaging surface portion to be engaged with the outer circumferential surface of the light-emitting portion of the discharge tube, the discharge tube can be reliably held.

In the discharge tube connector, the holding portion may include an engaging surface portion to be engaged with the end electrode of the discharge tube. Because the holding portion includes the engaging surface portion to be engaged with the end electrode of the discharge tube, a holding force of the engaging surface portion holding the discharge tube transfers to the end electrode engaged with the engaging surface portion without any change. In other words, the holding force of the engaging surface portion holding the discharge tube also acts as the pressing force of the end electrode to the conductive connection portion. Thus, electrical connection between the end electrode of the discharge tube and the conductive connection portion can be reliably realized. A member engaging the end electrode prevents an action of an excessive force on the light-emitting portion, so a damage to the light-emitting portion is suppressed.

In the discharge tube connector, the conductive connection portion may include a contact surface to contact with the end electrode which is exposed on an engaging surface of the engaging surface portion to be engaged with the end electrode of the discharge tube. Because the contact surface of the conductive connection portion to contact with the end electrode is exposed on the engaging surface of the engaging surface portion to be engaged with the end electrode of the discharge tube, the holding force of the engaging surface portion holding the discharge tube also acts as the pressing force on the end electrode engaged with the engaging surface portion, so electrical connection between the end electrode and the conductive connection portion can be reliably realized.

In the discharge tube connector, the engaging surface portion may have a bottomed cylindrical shape. Because the engaging surface portion has the bottomed cylindrical shape, the end portion of the discharge tube can be reliably held. The end electrode is covered with the engaging surface portion having the bottomed cylindrical shape, so a dust resistant action to a contact portion between the end electrode and the conductive connection portion can be realized. Therefore, a preferable contact state can be maintained.

In the discharge tube connector, the conductive connection portion may be provided to extend through an engaging surface portion to be engaged with the end electrode in a conductive connection direction, and the conductive connection portion may include end portions exposed on an outer circumferential surface located on both sides of the engaging surface portion. Because the conductive connection portion is provided to extend through the engaging surface portion engaged with the end electrode in the conductive connection direction, and because the end portions of the conductive connection portion are exposed on the outer circumferential surface located on both sides of the engaging surface portion, in a case where the discharge tube is installed to the device, when a part of the outer circumferential surface which is located on any one of both sides of the engaging surface portion is opposed to the circuit board, the conductive connection can be made between the board electrode and the end electrode. Thus, an installation operation can be simplified.

In the discharge tube connector, the conductive connection portion may include two contact surfaces to contact with the end electrode of the discharge tube, which are formed with a width larger than a diameter of the end electrode, and the two contact surfaces can be in contact with each other at a vicinity of the end electrode when a pressing protrusion is pressed. Because the two contact surfaces of the conductive connection portion to contact with the end electrode of the discharge tube are formed with the width larger than the diameter of the end electrode, and because, when the pressing protrusion is pressed, the two contact surfaces can be in contact with each other at the vicinity of the end electrode, a contact area between the end electrode and each of the conductive contact surfaces can be increased, so the end electrode and the conductive connection portion can be reliably conductively connected with each other.

The discharge tube connector may include a holding portion mounted to a second end portion of the discharge tube and a coupling portion extending in a longitudinal direction of the discharge tube, for connecting the holding portion mounted to the first end portion to the holding portion mounted to the second end portion. Because the discharge tube connector further includes the holding portion mounted to the second end portion of the discharge tube and the coupling portion extending in the longitudinal direction of the discharge tube, for connecting the holding portions mounted to the first end portion to the holding portion mounted to the second end portion, it is possible to produce an integrated product in which the holding portions for holding the discharge tube at both ends thereof are coupled to the coupling portion, with the result that the product can be easily mounted to the discharge tube. When the coupling portion has rubber-like elasticity, the connection between each of the holding portions and discharge tube can be reliably realized by a restoring force of the rubber-like elastic material when the discharge tube is mounted. That is, when the coupling portion slightly extends in a state in which the holding portions are mounted to both ends of the discharge tube, the discharge tube can be reliably engaged with the discharge tube connector by the restoring force of the rubber-like elastic material.

In the discharge tube connector, the coupling portion may include a conductive connection portion for conductively connecting a trigger electrode provided to the light-emitting portion of the discharge tube with another substrate electrode of the circuit board. When the discharge tube includes the trigger electrode as in the case of a flash discharge tube, the conductive connection between the trigger electrode and the circuit board is necessary. When the conductive connection portion for conductively connecting the trigger electrode of the discharge tube with the circuit board is provided in addition to the conductive connection portion for conductively connecting the trigger electrode of the discharge tube with the circuit board, the trigger electrode and the circuit board can be reliably conductively connected with each other without soldering. Even when a reflecting plate is interposed between the discharge tube and the circuit board, the conductive connection portion can be elastically in conductive contact with the reflecting plate, so a damage such as a crack to the light-emitting portion of the discharge tube can be suppressed.

In the discharge tube connector, the holding portion may include a mounting portion for a reflecting plate for reflecting light from the light-emitting portion. Because the holding portion includes the mounting portion for the reflecting plate for reflecting light from the light-emitting portion, an alignment between the reflecting plate and the discharge tube connector can be performed. Therefore, the reflecting plate is easily mounted to the discharge tube connector. Even when the discharge tube connector includes the coupling portion, the reflecting plate can be interposed between the discharge tube and the discharge tube connector. A mounting groove for inserting the reflecting plate to mount the reflecting plate to the discharge tube connector corresponds to the mounting portion.

In the discharge tube connector, the holding portion and the coupling portion may be integrally formed of a rubber-like elastic material. Because the holding portion and the coupling portion may be integrally formed of the rubber-like elastic material, for example, it is possible to employ a manufacturing method of using a liquid resin composition in which conductive materials are dispersed into a liquid polymer and concentrating and aligning the conductive materials in a mold. Therefore, the integrated molding is obtained from a material, so the discharge tube connector can be simply manufactured in low cost.

In the discharge tube connector, the holding portion may include a rubber-like elastic material, and the coupling portion may include a resin film. The holding portion and the coupling portion may be integrally formed of the rubber-like elastic material and the resin film. Because the holding portion and the coupling portion may be integrally formed of the rubber-like elastic material and the resin film, the integrated molding can be simply obtained by a manufacturing method of inserting the resin film into the mold and then injecting a liquid resin composition for the holding portion. Thus, the discharge tube connector can be manufactured in low cost. The coupling portion includes the resin film, so the discharge tube connector can be thinned.

According to the discharge tube connector of the present invention, the electrode of the discharge tube can be electrically connected with the circuit board without using lead wires and a soldering process can be removed. Further, the mounting of the discharge tube and the installation to the device are easy and a damage such as a crack to the light-emitting portion of the discharge tube can be suppressed.

The present invention is not limited to the above-mentioned description. The advantages, features, and usages of the present invention will be further clear by the following description with reference to the accompanying drawings. It should be understood that the scope of the present invention encompasses appropriate modifications made without departing from the spirit of the present invention.

DETAILED DESCRIPTION OF THE PREFERRED EMBODIMENTS

Figure 1:
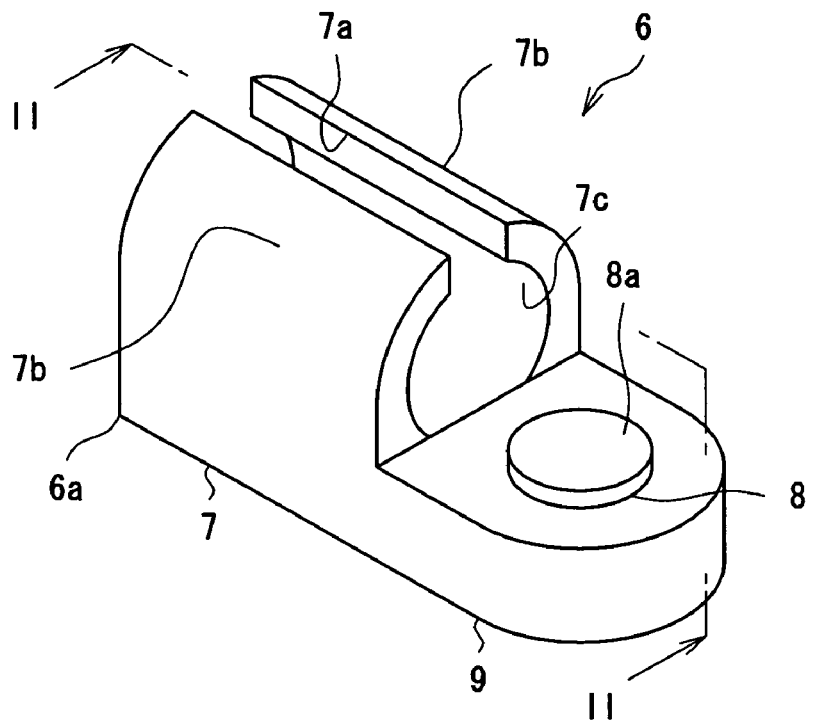
FIG. 1 is a perspective view showing a discharge tube connector according to a first embodiment of the present invention.

Hereinafter, embodiments of the present invention will be described with reference to the accompanying drawings. In the drawings, reference symbols indicate portions or parts. The duplicated description with respect to structures, materials, manufacturing methods, and the like which are common to the respective embodiments will be omitted.

Figure 2:
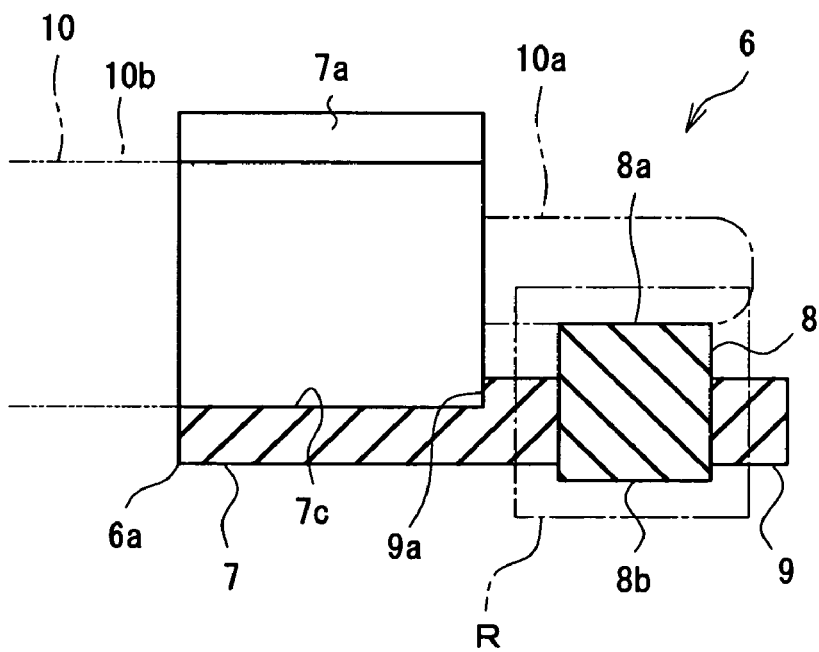
FIG. 2 is a cross sectional view along the line II-II of FIG. 1.
Figure 3:
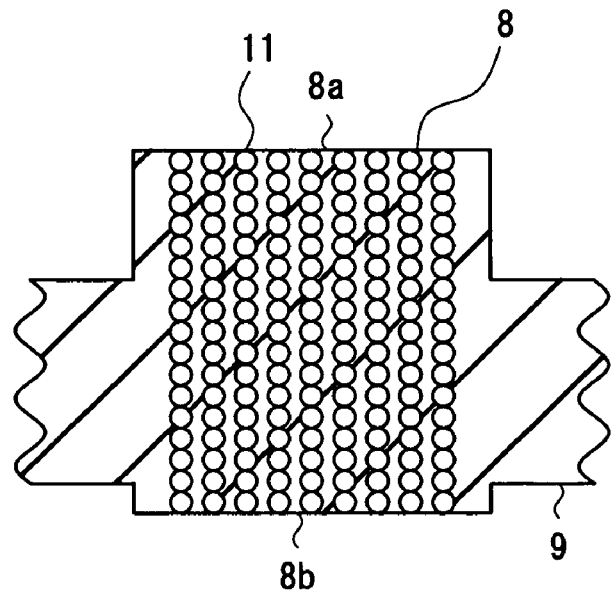
FIG. 3 is an enlarged cross sectional view showing a region R of FIG. 2.

First Embodiment {FIGS. 1 to 3}: FIGS. 1 to 3 show a discharge tube connector 6 according to a first embodiment. FIG. 1 is a perspective view showing the discharge tube connector 6 according to this embodiment. FIG. 2 is a cross sectional view along the line II-II of FIG. 1. FIG. 3 is an enlarged cross sectional view showing a region R of FIG. 2. The discharge tube connector 6 includes a holding portion 6a fitted to an end portion of a discharge tube 10. The holding portion 6a includes an engaging surface portion 7 for holding a light-emitting portion 10b of the discharge tube 10, a protruding piece portion 9 protruding along an end electrode 10a from the engaging surface portion 7, and a conductive connection portion 8 provided to the protruding piece portion 9 to conductively connect the end electrode 10a with a board electrode.

The engaging surface portion 7 engages an outer circumferential surface of the light-emitting portion 10b of the discharge tube 10. The engaging surface portion 7 has a substantially cylindrical shape. The engaging surface portion 7 includes a cut portion 7a provided between both end portions along the cylindrical axis direction to form arm-shaped holding claw portions 7b which are opposed to each other. That is, a cross sectional shape of each of the holding claw portions 7b in a direction perpendicular to the cylindrical axis direction is a substantially C-shape.

The protruding piece portion 9 extending from the engaging surface portion 7 is formed in the cylindrical axis direction of the engaging surface portion 7. As shown in FIG. 2, the protruding piece portion 9 includes a step portion 9a protruding in the direction perpendicular to the cylindrical axis direction from an engaging surface 7c which corresponds to an inner circumferential surface of the engaging surface portion 7 and is in contact with the discharge tube 10. The conductive connection portion 8 is provided in which the direction perpendicular to the cylindrical axis direction of the engaging surface portion 7 is a conductive connection direction. Both ends of the conductive connection portion 8 protrude higher than surfaces of the protruding piece portion 9 which are located around the ends in the conductive connection direction to become conductive contact surfaces 8a and 8b.

As shown in FIG. 3, the conductive connection portion 8 has a conductive path formed by connecting conductive materials 11 in chain in the conductive connection direction. The conductive contact surface 8a of the conductive connection portion 8 which is one end thereof is in contact with the end electrode 10a and the conductive contact surface 8b of the conductive connection portion 8 which is the other end thereof is in contact with the board electrode. Therefore, the discharge tube 10 and the circuit board are conductively connected with each other. When the holding portion 6a is made of a rubber-like elastic material, the conductive path made of the conductive materials 11 is formed in the rubber-like elastic material. Thus, the conductive connection portion 8 has rubber-like elasticity with a hardness of approximately 20 to 80 (A-hardness) measured by a type-A durometer on the basis of Japan Industrial Standard JIS K6253 (or ASTM D2240), preferably a hardness of 30 to 60. A conductive connection resistance of the conductive connection portion 8 is preferably a low resistance of equal to or smaller than 10Ω.

Hereinafter, materials of the respective members will be described. A material which can be easily shaped, such as a rubber-like elastic material or a synthetic resin can be used for the holding portion 6a. Examples of the rubber-like elastic material include thermosetting elastomer such as silicone rubber, natural rubber, isoprene rubber, butadiene rubber, 1, 2-polybutadiene rubber, styrene-butadiene rubber, chloroprene rubber, nitrile rubber, butyl rubber, ethylene propylene rubber, chlorosulfonated polyethylene rubber, acrylic rubber, epichlorohydrin rubber, fluororubber, or urethane rubber and thermoplastic elastomer such as styrene-based thermoplastic elastomer, olefin-based thermoplastic elastomer, ester-based thermoplastic elastomer, urethane-based thermoplastic elastomer, amide-based thermoplastic elastomer, vinyl chloride-based thermoplastic elastomer, or fluorothermoplastic elastomer. Of the above-mentioned materials, the silicone rubber is preferably used as a material whose electrical insulation property and weather resistance are excellent. A general-purpose resin which is a hard resin, such as a polyethylene resin, a polyester resin, an epoxy resin, a silicone resin, an ABS resin, or an acrylic resin can be used as the synthetic resin. When the holding portion 6a is made of the rubber-like elastic material or the synthetic resin, the entire discharge tube connector 6 can be integrally formed by one kind of mold, so manufacturing is easy and a manufacturing cost becomes lower. In order that the discharge tube 10 which is more likely to be damaged by external forces be held to achieve conductive connection with the circuit board, it is preferable to use, of the above-mentioned materials, the rubber-like elastic material. It is preferable to use a rubber-like elastic material whose hardness is approximately 10 to 70 (A-hardness) measured by a type-A durometer on the basis of Japan Industrial Standard JIS K6253 (or ASTM D2240). A rubber-like elastic material whose A-hardness is approximately 35 is one of specific preferable examples.

Magnetic conductive materials are used for the conductive materials 11 for forming the conductive path of the conductive connection portion 8 in order to cause, in a magnetic field, a state in which the magnetic conductive materials are linked together by contact in the rubber-like elastic material. For example, particle-like, fiber-like, or thin-wire-like magnetic conductive media made of metal or ceramic is used. To be specific, it is preferable to use nickel, cobalt, iron, ferrite, or an alloy containing mainly the elements. In addition, it is possible to use a good conductive metal such as gold, silver, platinum, aluminum, nickel, copper, iron, palladium, cobalt, or chromium, an alloy such as stainless steel, a powder or a thin wire which is made of resin, ceramic, or the like plated with a magnetic material, or conversely, it is possible to use a magnetic material plated with a good conductive metal.

Next, a method of manufacturing the discharge tube connector 6 will be described. First, the ferromagnetic conductive materials 11 of nickel or iron are added to a liquid polymer such as a liquid silicone rubber to prepare a liquid resin composition. A shaping mold having a cavity for the discharge tube connector 6 is prepared. Pins P for formation of the conductive connection portion 8 are embedded in the shaping mold. The pins P are made of magnetic material in order to magnetically align the conductive materials 11. Next, the liquid resin composition is injected to the cavity of the shaping mold. Then, the shaping mold is placed in a magnetic field to apply a magnetic force to the liquid resin composition in the cavity through the pins P, thereby aligning the conductive materials 11 in the conductive connection portion 8. After that, the shaping mold is heated to cure the liquid resin composition. A cured product is demolded to obtain the discharge tube connector 6.

When the discharge tube 10 is to be mounted to the obtained discharge tube connector 6, the discharge tube 10 is inserted thereto while the holding claw portions 7b of the engaging surface portion 7 are extended by force. At this time, as shown in FIG. 2, an end of the light-emitting portion 10b of the discharge tube 10 is pressed into contact with the step portion 9a. Then, the discharge tube 10 is positioned, so the end electrode 10a precisely locates on the conductive contact surface 8a of the conductive connection portion 8, thereby ensuring reliable contact between the end electrode 10a and the conductive connection portion 8. When the discharge tube 10 has a straight-tube-shape, the operation is performed on both ends of the discharge tube 10. In a case of attachment to the circuit board, the discharge tube connector 6 holding the discharge tube 10 is placed on the circuit board such that the conductive contact surface 8b of the conductive connection portion 8 is in contact with the board electrode on the circuit board which is not shown. When the discharge tube connector 6 is to be fixed onto the circuit board, the discharge tube connector 6 may be adhered to the circuit board by an adhesive. The discharge tube connector 6 can also be fixed to the circuit board by a holding force for pressing using a case and the like of a device to which the discharge tube 10 is installed.

The operation and effect of the discharge tube connector 6 according to this embodiment will be described. According to the discharge tube connector 6 of this embodiment, the end electrode 10a of the discharge tube 10 can be electrically connected with the board electrode on the circuit board through the conductive connection portion 8 without using lead wires. Therefore, a damage such as a crack, of the light-emitting portion 10b of the flash discharge tube 10 can be avoided. In particular, protrusion compression margins are provided for the conductive connection portion 8. Thus, the conductive contact surfaces 8a and 8b of the conductive connection portion 8 can be reliably electrically connected with the end electrode 10a and the board electrode so that stable conductive connection can be realized.

When the holding portion 6a is made of a rubber-like elastic material, the conductive connection portion 8 has rubber-like elasticity, so the conductive connection portion 8 can be pressed between the end electrode 10a and the board electrode on the circuit board to conductively connect the end electrode 10a with the board electrode. Therefore, the soldering operation can be omitted. Thus, installation does not take time, so a manufacturing cost can be reduced.

The cut portion 7a is formed in the engaging surface portion 7, so the engaging surface portion 7 can be easily attached to or detached from the discharge tube 10. Thus, even when the discharge tube connector 6 is fixed to the circuit board, the discharge tube 10 can be easily assembled.

Figure 4:
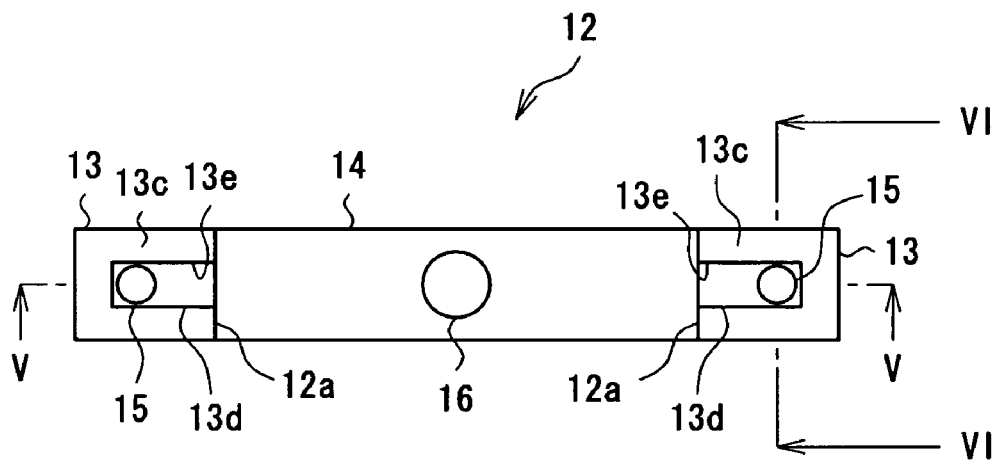
FIG. 4 is a plan view showing a discharge tube connector according to a second embodiment of the present invention.
Figure 5:
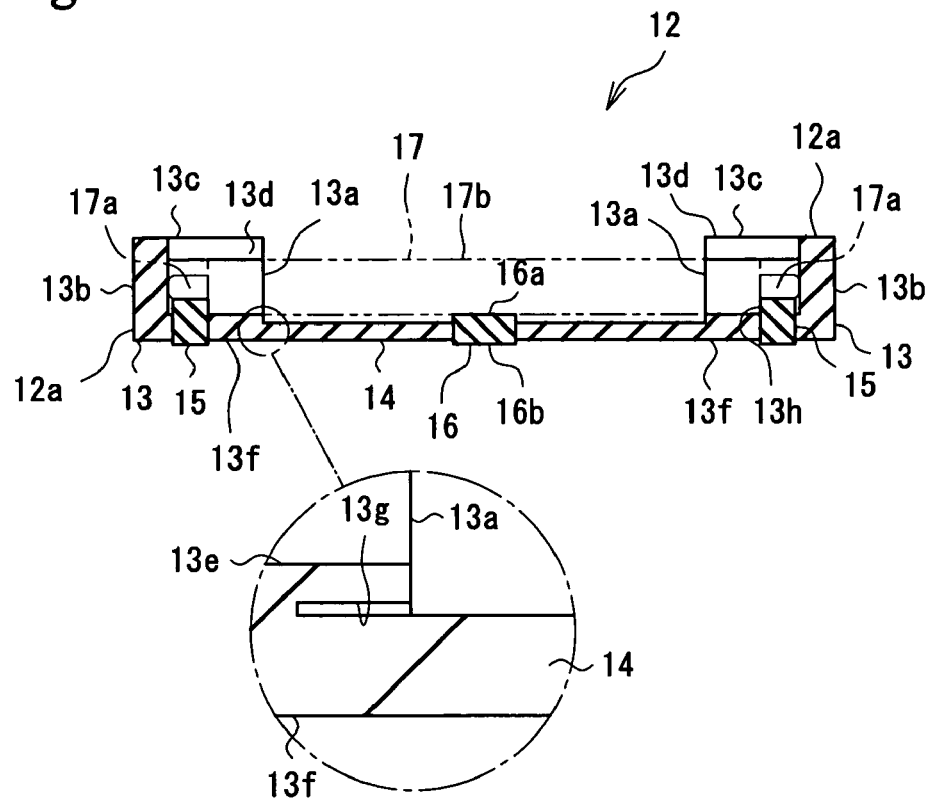
FIG. 5 is a cross sectional view along the line V-V of FIG. 4.
Figure 6:
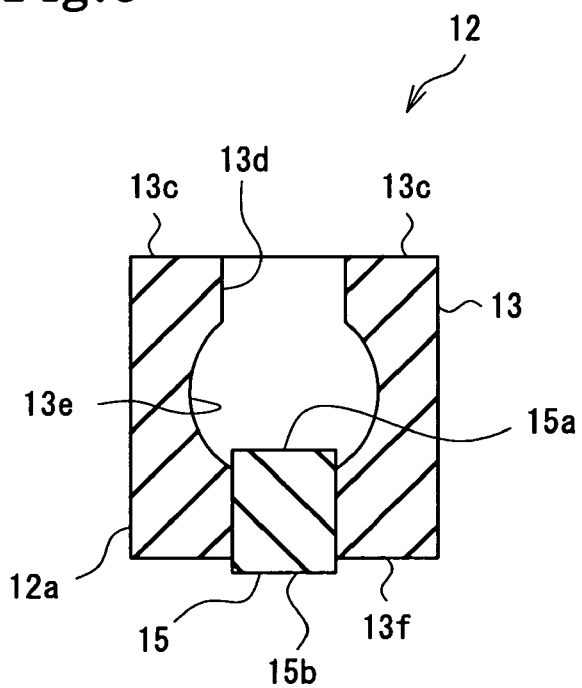
FIG. 6 is a cross sectional view along the line VI-VI of FIG. 4.

Second Embodiment {FIGS. 4 to 6}: FIGS. 4 to 6 show a discharge tube connector 12 according to a second embodiment of the present invention. FIG. 4 is a plan view showing the discharge tube connector 12 according to this embodiment. FIG. 5 is a cross sectional view along the line V-V of FIG. 4. FIG. 6 is a cross sectional view along the line VI-VI of FIG. 4. The discharge tube connector 12 according to this embodiment is different from the discharge tube connector 6 according to the first embodiment in the point that a shape of two holding portions 12a is changed, a coupling portion 14 for integrally coupling the two holding portions 12a, 12a to each other is provided, and a conductive connection portion 16 is formed for a trigger electrode. In this embodiment, an example will be described in which a flash discharge tube 17 is used as the discharge tube.

That is, as shown in FIGS. 4 and 5, the discharge tube connector 12 includes the holding portions 12a fitted to end portions of the flash discharge tube 17 and the coupling portion 14 which extends in the longitudinal direction of the flash discharge tube 17 to couple the two holding portions 12a, 12a to each other. Each of the holding portions 12a includes an engaging surface portion 13 which engages the flash discharge tube 17 and a conductive connection portion 15 for conductively connecting an end electrode 17a of the flash discharge tube 17 with a board electrode of a circuit board which is not shown.

With respect to the holding portions 12a, the two holding portions 12a, 12a are symmetrically opposed to each other in both ends of the discharge tube connector 12. The engaging surface portion 13 included in each of the holding portions 12a engages the flash discharge tube 17. The engaging surface portion 13 has a bottomed cylindrical shape in which a circular opening portion 13a is located on one end side, a bottom portion 13b for closing is located on the other end side, and a cut portion 13d is provided between the opening portion 13a and the bottom portion 13b. The engaging surface portion 13 has an engaging surface 13e which is located on an inner side thereof and formed in a shape corresponding to the end electrode 17a or a light-emitting portion 17b of the flash discharge tube 17. The engaging surface 13e not only engages an outer circumferential surface of the light-emitting portion 17b but also engages the end electrode 17a. The engaging surface portion 13 has an outer circumferential surface 13f which is located on an outer side thereof and formed in a rectangular shape so as to easily hold the discharge tube connector 12 between the circuit board and a member included in a device. Therefore, holding claws 13c whose outer walls are opposed to each other are formed.

The conductive connection portion 15 included in each of the holding portions 12a employs a structure in which the conducive materials 11 are aligned in the conductive connection direction as in the case of the conductive connection portion 8 of the discharge tube connector 6 which is described in the first embodiment and thus has the same function. Note that, the conductive connection portion 15 includes a conductive contact surface 15 protruding higher than the engaging surface 13e of the engaging surface portion 13, so the conductive contact surface 15 corresponds to a part of the engaging surface portion 13. The conductive contact surface 15a protrudes higher than a peripheral surface of the conductive connection portion 15. To be more specific, as shown in FIG. 6, the conductive contact surface 15a corresponds to a part of the engaging surface portion 13. The conductive contact surface 15a of the conductive connection portion 15 is included in the engaging surface 13e of the engaging surface portion 13 and protrudes higher than the periphery of the engaging surface 13e to locate the conductive connection portion 15 at a middle point between the two holding claws 13c, 13c. Therefore, a holding force of each of the holding claws 13c holding the flash discharge tube 17 also acts as a pressing force of the end electrode 17a to the conductive contact surface 15a.

The conductive connection portion 16 conductively connected with the trigger electrode (not shown) of the flash discharge tube 17 is formed at substantially the center of the coupling portion 14 for coupling the holding portions 12a, 12a to each other. The conductive connection portion 16 has the structure in which the conductive materials 11 are aligned as in the case of the conductive connection portion 15. The conductive connection portion 16 extends through the coupling portion 14 and protrudes from a surface of the coupling portion 14 in the conductive connection direction. The connection between the conductive connection portion 16 and the trigger electrode may be indirect connection through a reflecting plate or direct connection with the trigger electrode to avoid contact with the reflecting plate. As shown in FIG. 5, a mounting groove 13g serving as a mounting portion for mounting the reflecting plate is formed in an interface between each of the holding portions 12a and the coupling portion 14.

When the discharge tube connector 12 is to be installed, first, the reflecting plate is inserted through the mounting groove 13g of the discharge tube connector 12. Then, pin terminals which are the end electrodes 17a of the flash discharge tube 17 are fitted to the engaging surface portions 13. At this time, ends of the light-emitting portion 17b of the flash discharge tube 17 are in contact with step portions 13h protruding higher than the engaging surfaces 13e corresponding to inner circumferential surfaces of the holding claws 13c. Therefore, the end electrode 17a can be precisely positioned on the conductive contact surface 15a of the conductive connection portion 15 to align the flash discharge tube 17 with the discharge tube connector 12, with the result that the contact between the end electrode 17a and the conductive connection portion 15 is reliably ensured. The trigger electrode of the flash discharge tube 17 is brought into contact with a conductive connection piece provided to the reflecting plate to bring the reflecting plate into contact with a conductive contact surface 16a of the conductive connection portion 16. After the mounting of the flash discharge tube 17, a conductive contact surface 15b of the conductive connection portion 15 and the conductive contact surface 16a of the conductive connection portion 16 are placed on the board electrode located on the circuit board. Then, the discharge tube connector 12 is pressed against the circuit board, for example, by using a case of a device to which the discharge tube 10 is installed, thereby fixing the discharge tube connector 12 onto the circuit board.

The operation and effect of the discharge tube connector 12 according to this embodiment will be described. The same operation and effect as the discharge tube connector 6 according to the first embodiment can be obtained. The following operation and effect can be further obtained. That is, according to the discharge tube connector 12, conductive connection contact with the circuit board can be realized without using not only the end electrodes 17a but also the trigger electrode and the lead wires. The coupling portion 14 for coupling the two holding portions 12a to each other is provided, so the two holding portions 12a can be integrally formed. Therefore, the flash discharge tube 17 can be easily mounted.

The engaging surface portion 13 is formed in the bottomed cylindrical shape. Therefore, when the end electrodes 17a of the flash discharge tube 17 are covered, the contact between the end electrode 17a and a peripheral member can be suppressed, so the insulation between the end electrode 17a and a peripheral member can be improved to reduce conductive leakage.

The holding claws 13c engaging the flash discharge tube 17 engage the end electrodes 17a of the flash discharge tube 17, so an excessive force is not applied to the light-emitting portion 17b. Therefore, a damage to the light-emitting portion 17b is suppressed. The conductive contact surface 15a of the conductive connection portion 15 protrudes higher than the engaging surface 13e of the engaging surface portion 13 which engages the end electrode 17a and thus the conductive connection portion 15 corresponds to a part of the engaging surface portion 13, so a holding force of the engaging surface portion 13 holding the flash discharge tube 17 transfers to the end electrode 17a engaged with the engaging surface portion 13 without any change. In other words, the holding force of the engaging surface portion 13 holding the flash discharge tube 17 also acts as the pressing force of the end electrode 17a to the conductive connection portion 15. Thus, electrical connection between the end electrode 17a and the conductive connection portion 15 can be reliably realized.

Figure 7:
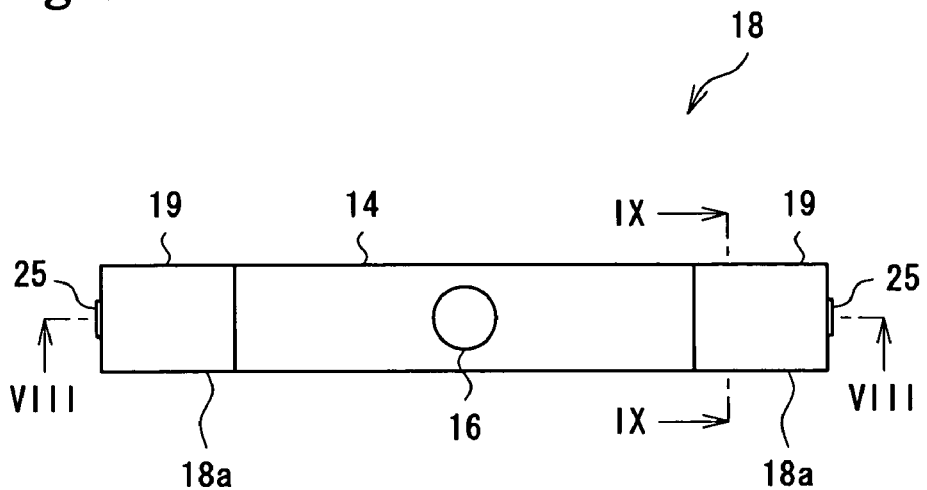
FIG. 7 is a plan view showing a discharge tube connector according to a third embodiment of the present invention.
Figure 8:
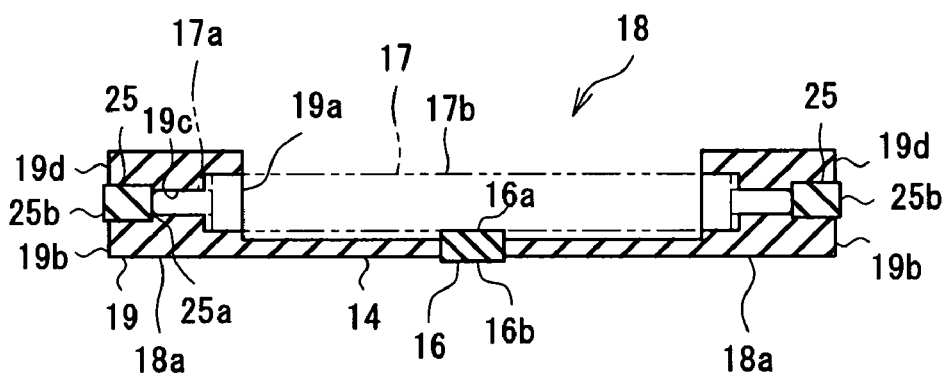
FIG. 8 is a cross sectional view along the line VIII-VIII of FIG. 7.
Figure 9:
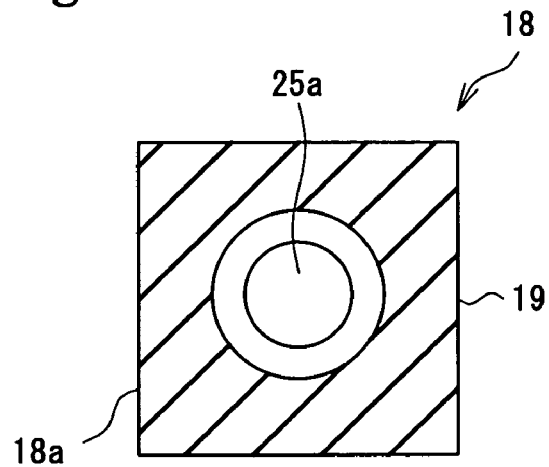
FIG. 9 is a cross sectional view along the line IX-IX of FIG. 9.
Figure 10:
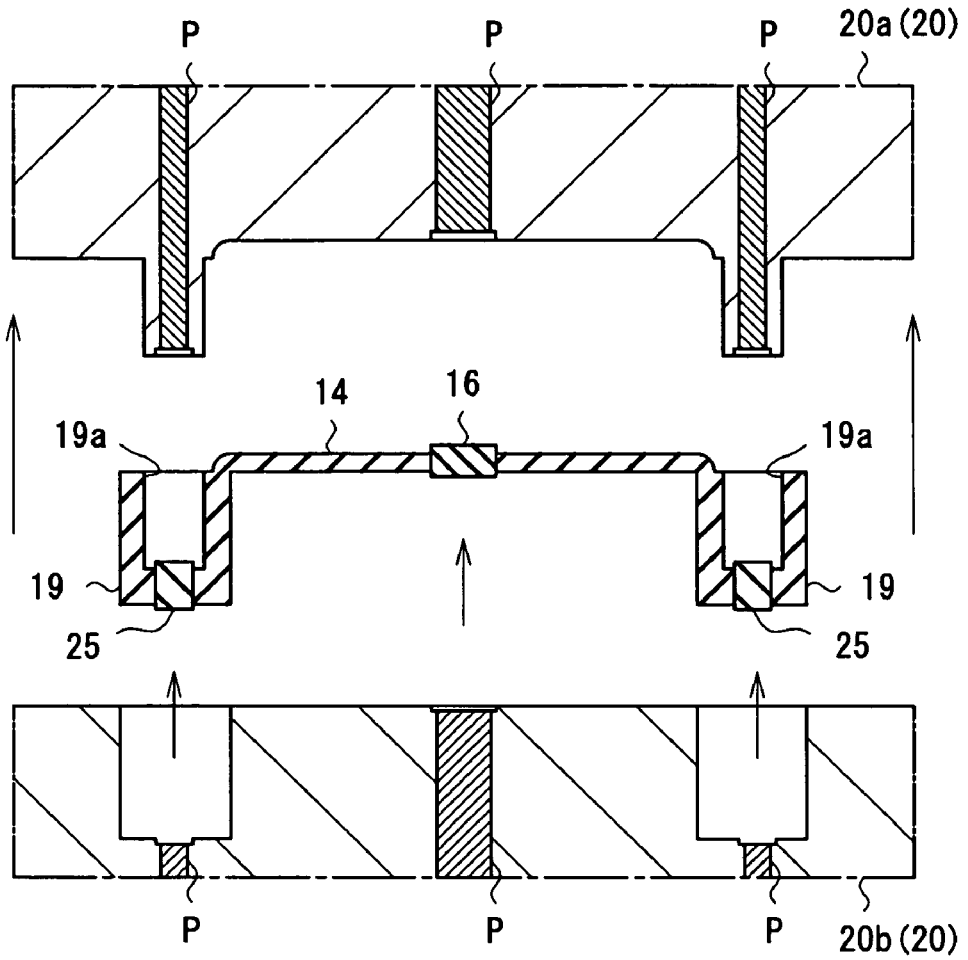
FIG. 10 is an explanatory view showing a process of manufacturing the discharge tube connector according to the third embodiment.
Figure 11:
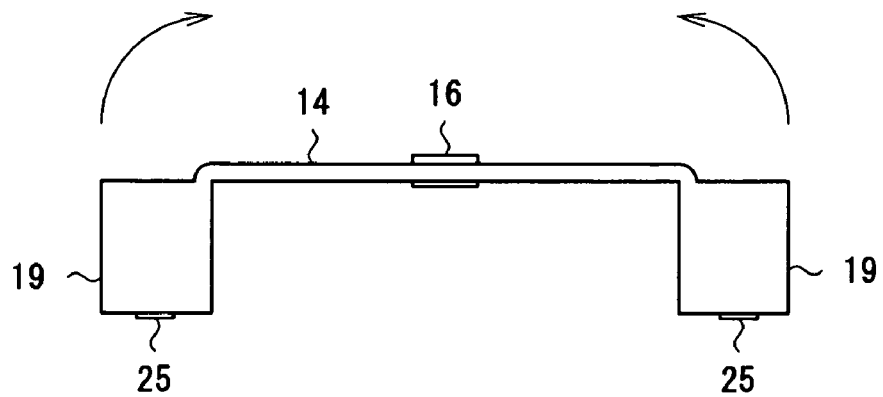
FIG. 11 is an explanatory view showing the discharge tube connector according to the third embodiment.

Third Embodiment {FIGS. 7 to 11}: FIGS. 7 to 11 show a discharge tube connector 18 according to a third embodiment of the present invention. FIG. 7 is a plan view showing the discharge tube connector 18 according to this embodiment. FIG. 8 is a cross sectional view along the line VIII-VIII of FIG. 7. FIG. 9 is a cross sectional view along the line IX-IX of FIG. 7. FIGS. 10 and 11 show an example of a process of manufacturing the discharge tube connector 18. The discharge tube connector 18 according to this embodiment is different from the discharge tube connector 12 according to the second embodiment in the point that the cut portion 13d is removed from an engaging surface portion 19 of each of holding portions 18a and a position of a conductive connection portion 25 of the engaging surface portion 19 is changed.

The discharge tube connector 18 according to this embodiment includes two holding portions 18a,18a holding the flash discharge tube 17 at both ends of the flash discharge tube 17 and the coupling portion 14 for coupling the two holding portions 18a,18a to each other. Further, each of the holding portions 18a includes the engaging surface portion 19 which engages the flash discharge tube 17, the conductive connection portion 25 for conductively connecting the end electrode 17a of the flash discharge tube 17 with the board electrode of the circuit board which is not shown, and the conductive connection portion 16 for conductively connecting the trigger electrode of the flash discharge tube 17 with the board electrode of the circuit board.

The engaging surface portion 19 has a bottomed cylindrical shape as in the case of the engaging surface portion 13 described in the second embodiment. As shown in FIG. 9, a cross sectional shape perpendicular to a cylindrical axis of the bottomed cylindrical shape has a rectangular outer region and a circular inner region. A circular opening portion 19a is provided on one end side of the bottomed cylindrical shape and a bottom portion 19b for closing is provided on the other end side thereof. Unlike the second embodiment, the cut portion is not provided. The cylindrical conductive connection portion 25 whose cylindrical axis direction is the conductive connection direction is provided along the cylindrical axis direction at substantially the center of the bottom portion 19b. A first conductive contact surface 25a of the conductive connection portion 25 which is in contact with the end electrode 17a of the flash discharge tube 17 protrudes higher than an inner surface 19c of the bottom portion 19b in an inside direction and a second conductive contact surface 25b thereof protrudes higher than an outer surface 19d of the bottom portion 19b in an outside direction. An inner surface of the engaging surface portion 19 is formed in a shape corresponding to an outer circumferential shape of the flash discharge tube 17 to obtain the engaging surface (inner surface) 19c engaging both the light-emitting portion 17b and the end electrode 17a of the flash discharge tube 17.

The flash discharge tube 17 is mounted by inserting the end electrode 17a into the inner portion of each of the engaging surface portions 19. When the flash discharge tube 17 is inserted to the depth portion of each of the engaging surface portions 19, a tip end of the end electrode 17a is in contact with the conductive connection portion 25. The trigger electrode of the flash discharge tube 17 is in contact with the conductive connection portion 16.

The discharge tube connector 18 can be manufactured as in the case of the discharge tube connector 6 according to the first embodiment. FIG. 10 shows a shaping mold 20 used to manufacture the discharge tube connector 18. Protrusions for the opening portions 19a of the engaging surface portions 19 are provided to an upper mold 20a. Cavities for the engaging surface portions 19 are formed to a lower mold 20b. When the mold 20 is used, the pins P for aligning the conductive materials can be embedded in each of the upper mold 20a and the lower mold 20b in the same direction, so the conductive connection direction of the conductive connection portion 25 can be aligned with the conductive connection direction of the conductive connection portion 16 to easily apply a magnetic field. Therefore, according to the shaping mold 20, as shown in FIG. 11, the obtained discharge tube connector 18 has the coupling portion 14 whose both ends are bent at right angles.

The structure of the shaping mold is simplified, so it is possible to reduce a mold manufacturing cost and a manufacturing cost of the discharge tube connector 18. In addition, a product manufacturing yield can be improved. Even when the coupling portion 14 is bent, the coupling portion 14 made of a rubber-like elastic material can be easily bent in directions indicated by arrows shown in FIG. 11, so the flash discharge tube 17 can be easily mounted.

According to the discharge tube connector 18 of the third embodiment, the same operation and effect as the discharge tube connector 12 according to the second embodiment can be obtained. The following operation and effect can be further obtained. That is, according to the discharge tube connector 18, the engaging surface portion 19 covers the entire end electrode 17a of the flash discharge tube 17, so the contact with peripheral members can be completely prevented to ensure high insulation.

When the flash discharge tube 17 is mounted to the discharge tube connector 18, the conductive connection portion 25 acts to press the end electrode 17a by a restoring force of the coupling portion 14. Therefore, the conductive connection contact between the flash discharge tube 17 and the discharge tube connector 18 can be reliably realized. When the flash discharge tube 17 can be mounted to the discharge tube connector 18 in such a pressing state, high dimension precision of a contact position therebetween is unnecessary, with the result that a manufacturing yield of the discharge tube connector 18 can be improved.

Figure 12:
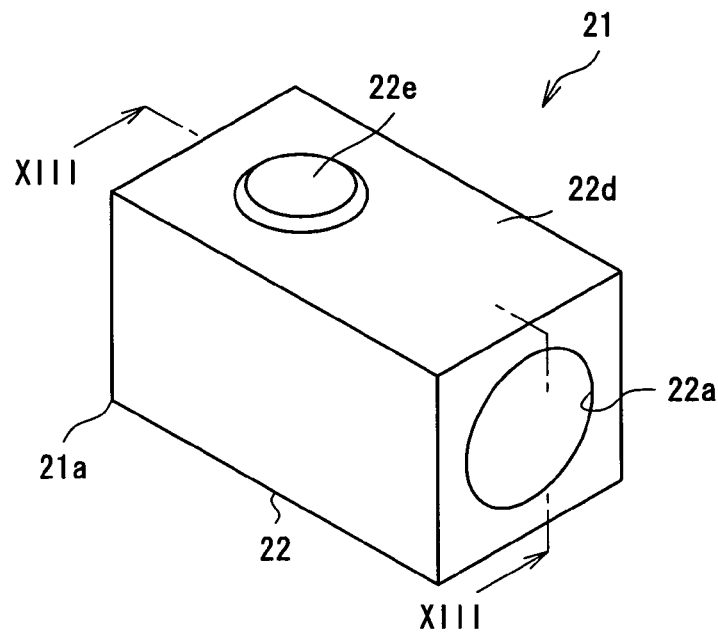
FIG. 12 is a perspective view showing a discharge tube connector according to a fourth embodiment of the present invention.
Figure 13:
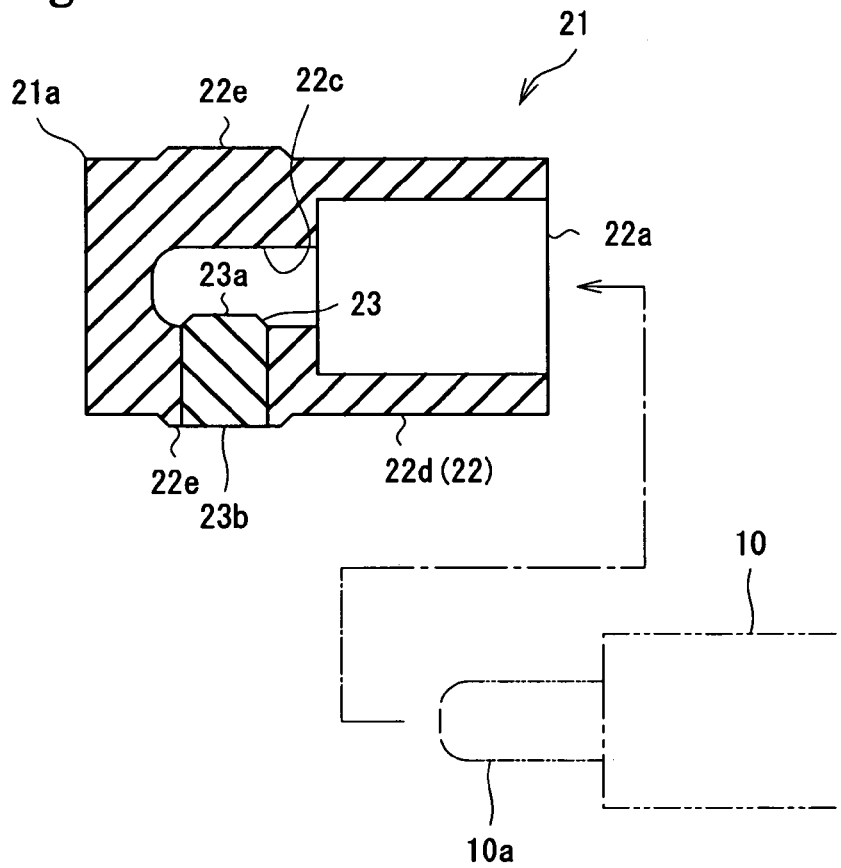
FIG. 13 is a cross sectional view along the line XIII-XIII of FIG. 12.

Fourth Embodiment {FIGS. 12 and 13}: FIGS. 12 and 13 show a discharge tube connector 21 according to a fourth embodiment of the present invention. FIG. 12 is a perspective view showing the discharge tube connector 21 according to this embodiment. FIG. 13 is a cross sectional view along the line XIII-XIII of FIG. 12. The discharge tube connector 21 according to this embodiment is different from the discharge tube connector 6 according to the first embodiment in the point that a pressing protrusion 22e is provided to an engaging surface portion 22 of a holding portion 21a as shown in FIGS. 12 and 13. The discharge tube connector 21 according to a fourth embodiment includes the engaging surface portion 22 which engages the discharge tube 10 to hold the discharge tube 10. The engaging surface portion 22 includes a conductive connection portion 23 for conductively connecting an electrode of the discharge tube 10 with a board electrode of the circuit board.

When a shape of the engaging surface portion 22 is compared with that of the engaging surface portion 13 of the discharge connector 12 according to the second embodiment, substantially the same shape is employed except for the point that the entire end portion of the discharge tube 10 is covered without providing the cut portion. As shown in FIG. 13, an inner circumferential surface of the engaging surface portion 22 includes an engaging surface 22c corresponding to an outer shape of an end portion of the discharge tube 10 to be mounted. A conductive connection portion 23 in which the direction perpendicular to the cylindrical axis direction of the engaging surface portion 22 is the conductive connection direction is provided to the engaging surface portion 22. A conductive contact surface 23a of the conductive connection portion 23 which is located on a connection end side with the end electrode 10a is formed to be exposed and protrude higher than a part of the engaging surface 22c around the conductive contact surface 23a. A conductive contact surface 23b of the conductive connection portion 23 which is located on a connection end side with the board electrode also protrudes higher than a surface around the conductive contact surface 23b. Pressing protrusions 22e protruding outwardly from an outer circumferential surface 22d of the engaging surface portion 22 in an extended line direction of the conductive connection portion 23 are formed on an extended line of the conductive connection portion 23 in the conductive connection direction.

The pressing protrusions 22e protruding from the flat outer circumferential surface 22d are provided outside the cylindrical engaging surface portion 22. Therefore, when the discharge tube 10 is mounted to the discharge tube connector 21 to install to a device, the pressing protrusions 22e of the conductive connection portion 23 are pressed by a member such as a case of the device. Accordingly, a contact pressure between the end electrode 10a and the conductive connection portion 23 in the conductive connection direction can be increased, so the conductive connection contact between the end electrode 10a and the conductive connection portion 23 can be reliably realized. In addition, a holding force between the discharge tube 10 and the discharge tube connector 21 in a region of the end electrode 10a of the discharge tube 10 can be increased. Therefore, a pressure applied to the light-emitting portion 10b of the discharge tube 10 can be reduced, so the breaking of the light-emitting portion 10b can be suppressed.

Figure 14:
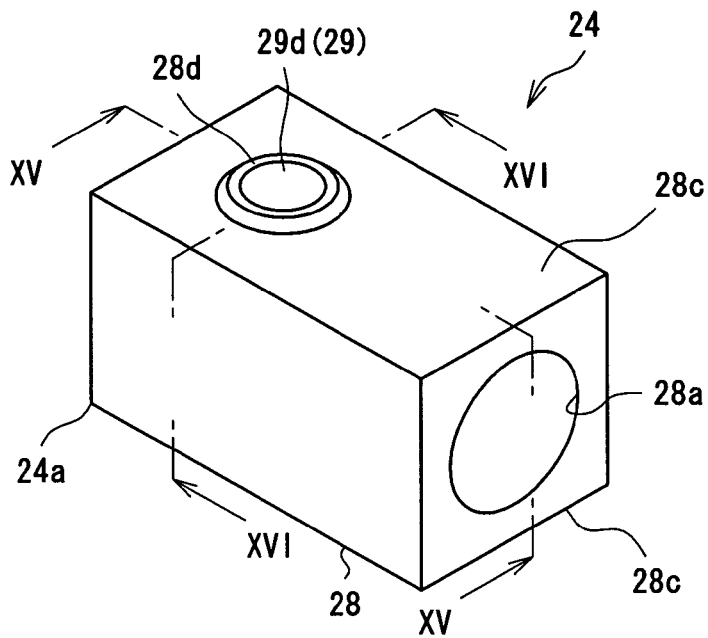
FIG. 14 is a perspective view showing a discharge tube connector according to a fifth embodiment of the present invention.
Figure 15:
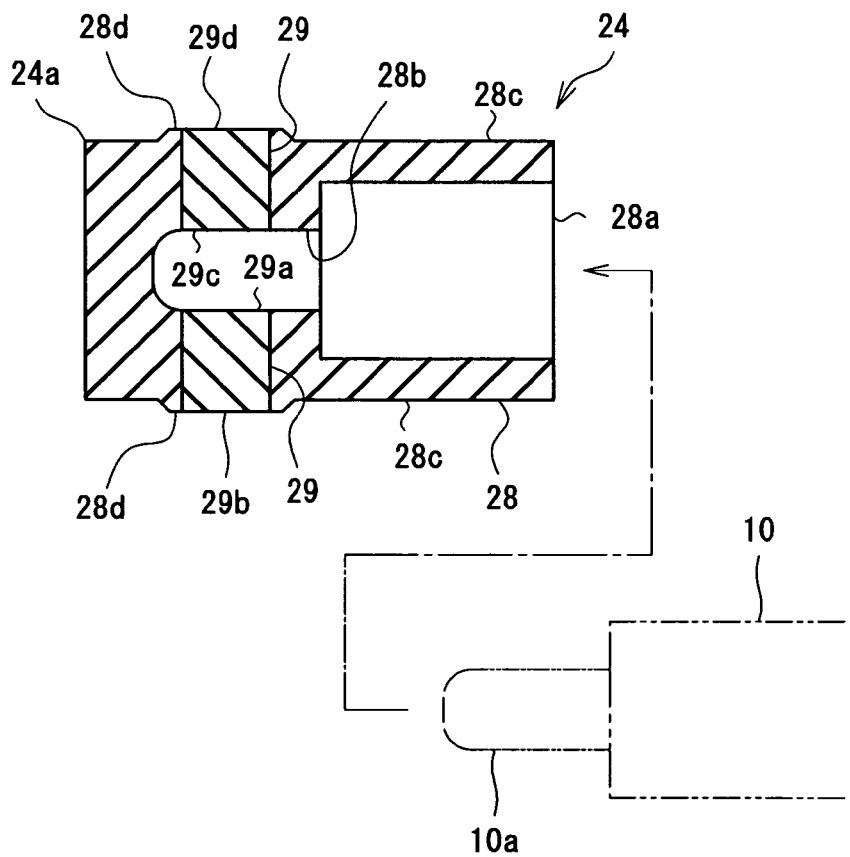
FIG. 15 is a cross sectional view along the line XV-XV of FIG. 14.
Figure 16:
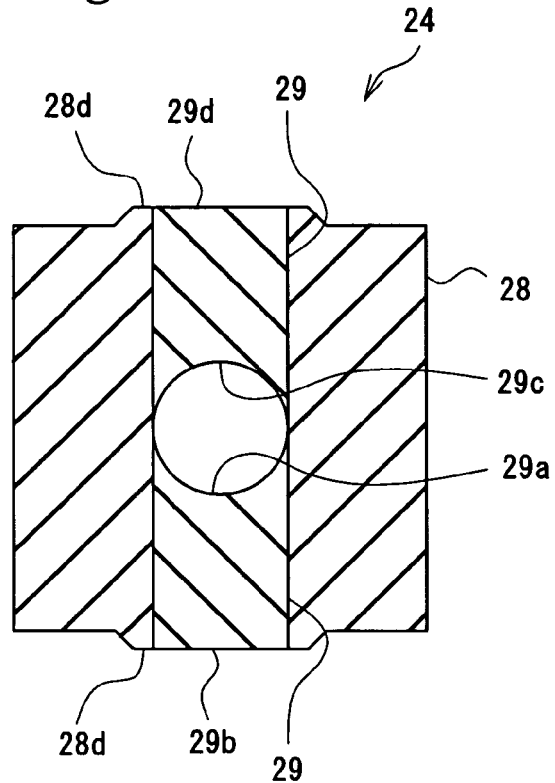
FIG. 16 is a cross sectional view along the line XVI-XVI of FIG. 14.

Fifth Embodiment {FIGS. 14 to 16}: FIGS. 14 to 16 show a discharge tube connector 24 according to a fifth embodiment of the present invention. FIG. 14 is a perspective view showing the discharge tube connector 24 according to this embodiment. FIG. 15 is a cross sectional view along the line XV-XV of FIG. 14. FIG. 16 is a cross sectional view along the line XVI-XVI of FIG. 14. The discharge tube connector 24 according to this embodiment is different from the discharge tube connector 21 according to the fourth embodiment in that a conductive connection portion 29 is provided to extend through an engaging surface portion 28 engaged with the end electrode 10a in the conductive connection direction, and in that end portions 29b and 29d of the conductive connection portion 29 are exposed on outer circumferential surfaces 28c, 28c located on both sides of the engaging surface portion 28.

When the engaging surface portion 28 of a holding portion 24a is compared with that of the engaging surface portion 22 of the discharge connector 21 according to the fourth embodiment, substantially the same shape is employed except for a shape of the conductive connection portion 29 described later. As shown in FIG. 15, an inner circumferential surface of the engaging surface portion 28 includes an engaging surface 28b corresponding to an outer shape of an end portion of the discharge tube 10 to be mounted. The conductive connection portion 29 in which the direction perpendicular to the cylindrical axis direction of the engaging surface portion 29 is the conductive connection direction is provided to the engaging surface portion 28. The conductive connection portion 29 extends through the engaging surface portion 28 to be exposed on the outer circumferential surfaces 28c, 28c located on both sides of the engaging surface portion 28. Conductive contact surfaces 29a and 29c of the conductive connection portion 29 which are located on connection end sides with the end electrode 10a are exposed in the engaging surface 28b. Pressing protrusions 28d are formed in the conductive contact surfaces (end portions) 29b and 29d of the conductive connection portion 29 which are located on connection end sides with the board electrode to protrude higher than surfaces around the pressing protrusions 28d. As shown in FIG. 16, a contact surface of the conductive connection portion 29 to contact with the end electrode 10a is formed in an arc cross sectional shape to prevent a gap with the end electrode 10a whose cross sectional shape is a circular shape.

The discharge tube connector 24 according to this embodiment includes the conductive connection portion 29 which extends from the board electrode side to the end electrode side and further extends up to an opposite side of the board electrode through the engaging surface portion 28. That is, the conductive connection portion 29 is formed on both sides of a region in which the end electrode 10a is located, to sandwich the region, so a contact surface of the conductive connection portion 29 to contact with the end electrode 10a can be increased. Therefore, sufficient electrical connection with the discharge tube can be realized. In addition, an end electrode 10a is sandwiched by conductive connection portion 29 of the same hardness from both sides and it is fixed to, so standfast of the end electrode 10a can be stabilized and the connection of the electricity can be assured.

The discharge tube connector 24 according to this embodiment includes the conductive connection portion 29 extending through the engaging surface portion 28. Therefore, in a case where the discharge tube 10 is to be installed to a device, when any one of the conductive contact surfaces 29b and 29d is opposed to the circuit board, the conductive connection can be made, so an installation operation can be easily performed.

Figure 17:
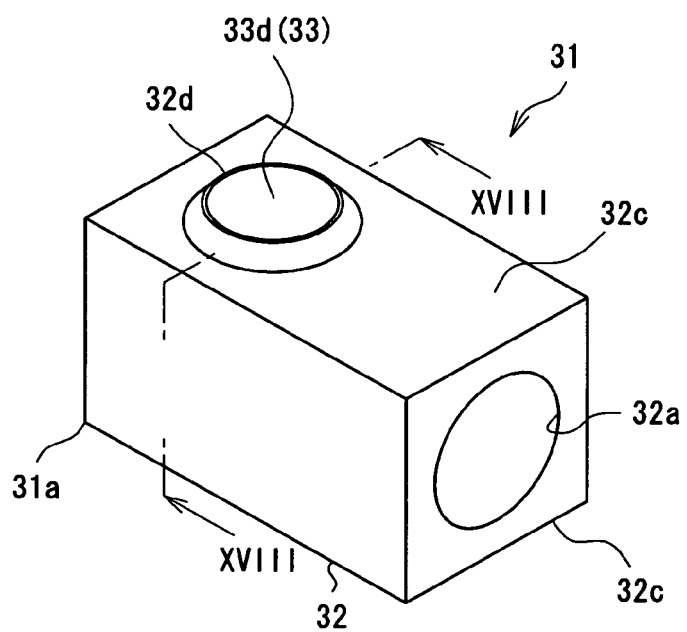
FIG. 17 is a perspective view showing a discharge tube connector according to a sixth embodiment of the present invention.
Figure 18:
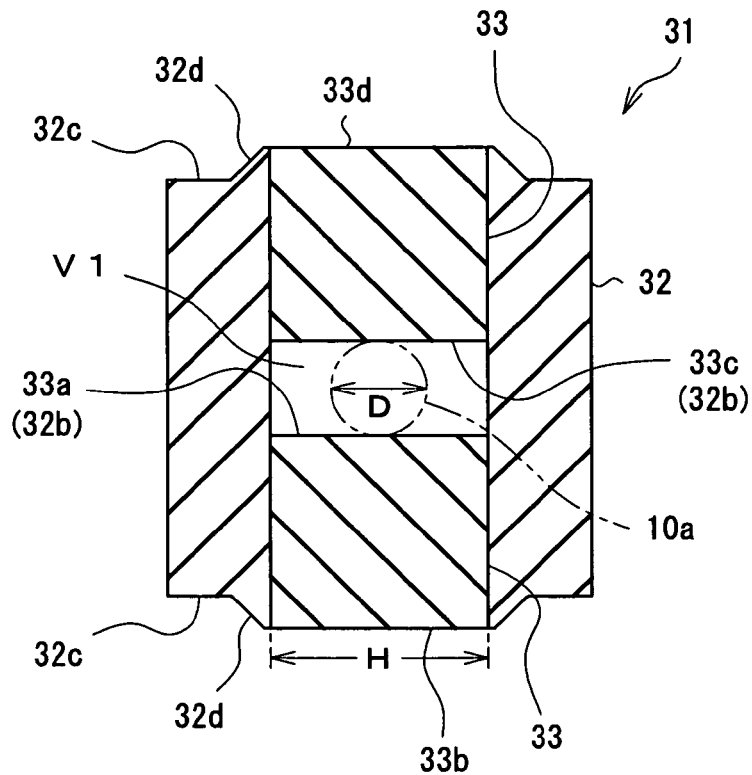
FIG. 18 is a cross sectional view along the line XVIII-XVIII of FIG. 17.
Figure 19:
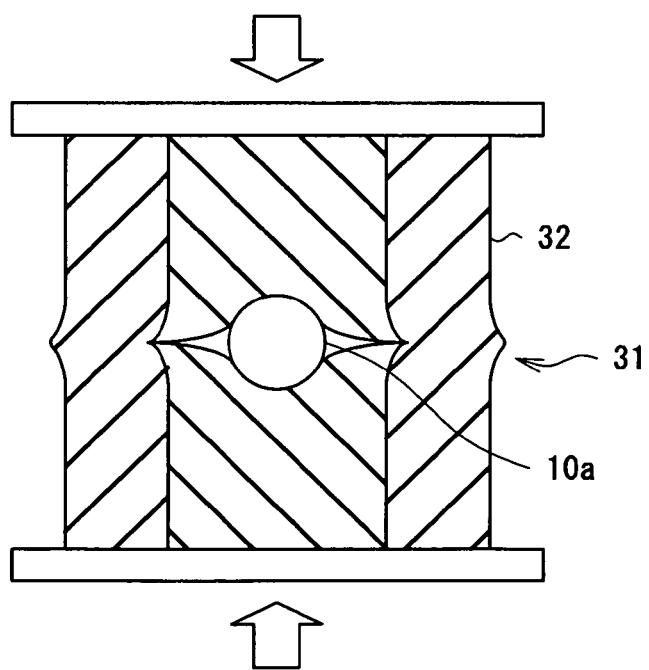
FIG. 19 is an explanatory cross sectional view showing a case where the discharge tube connector according to the sixth embodiment is pressed.

Sixth Embodiment {FIGS. 17 to 19}: FIGS. 17 to 19 show a discharge tube connector 31 according to a sixth embodiment of the present invention. FIG. 17 is a perspective view showing the discharge tube connector 31 according to this embodiment. FIG. 18 is a cross sectional view along the line XVIII-XVIII of FIG. 17. FIG. 19 is a cross sectional view showing a case where the discharge tube connector 31 is pressed. The discharge tube connector 31 according to this embodiment is different from the discharge tube connector 24 according to the fifth embodiment in a structure of a conductive connection portion 33, particularly, in a shape of conductive contact surfaces 33a and 33c to contact with the end electrode 10a of the discharge tube.

When an engaging surface portion 32 of a holding portion 31a is compared with that of the engaging surface portion 28 of the discharge tube connector 24 according to the fifth embodiment, substantially the same shape is employed with respect to the outer circumferential surfaces 32c. However, as shown in FIG. 18, a shape of an engaging surface 32b into which the end electrode 10a is inserted is changed. That is, the conductive contact surfaces 33a and 33c located on the connection end side with the end electrode 10a are exposed in the engaging surface 32b, so a space surrounded by the conductive contact surfaces 33a and 33c forms a gap V1 with the end electrode 10a. In other words, the conductive contact surfaces 33a and 33c are flatter than the end electrode 10a whose cross sectional shape is the circular shape and a width H of the conductive contact surfaces 33a and 33c is larger than a diameter D of the end electrode 10a. Therefore, an inner space into which the end electrode 10a is inserted has a rectangular solid shape. The conductive connection portion 33 includes conductive contact surfaces 33b and 33d which are opposed to the end electrode 10a and exposed on the outer circumferential surfaces 32c, 32c located on both sides of the engaging surface portion 32. The conductive contact surfaces 33b and 33d include pressing protrusions 32d, respectively. According to such a structure, when the discharge tube connector 31 to which the discharge tube is attached is installed to a flash device or the like, the pressing protrusions 32d are pressed in the conductive connection direction. Then, as shown in FIG. 19, the engaging surface portion 32 slightly expands to the outside to lose the gap V1. Therefore, the two conductive contact surfaces 33a and 33c are in contact with each other while the end electrode 10a is sandwiched therebetween.

According to the discharge tube connector 31 in this embodiment, when the discharge tube 10 is installed to the device, the gap V1 is lost by pressing forces on the pressing protrusions 32d to closely hold the end electrode 10a by the two conductive contact surfaces 33a and 33c of the conductive connection portion 33. Therefore, a contact area between the end electrode 10a and each of the conductive contact surfaces 33a and 33c can be increased, so conductive connection between the end electrode 10a and the conductive connection portion 33 can be reliably realized.

Figure 20:
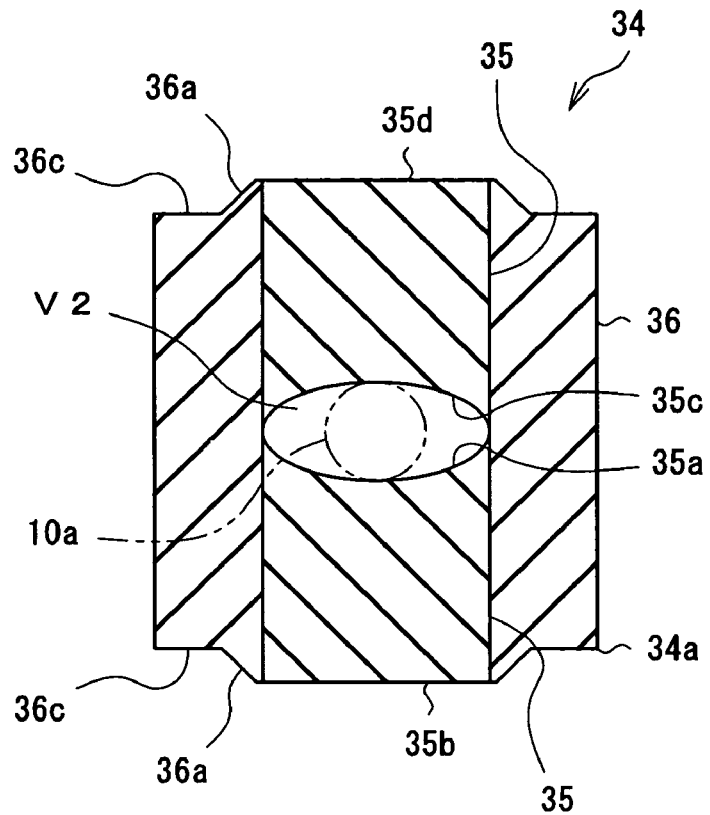
FIG. 20 shows a modified example of the discharge tube connector according to the sixth embodiment and corresponds to FIG. 18.
Figure 21:
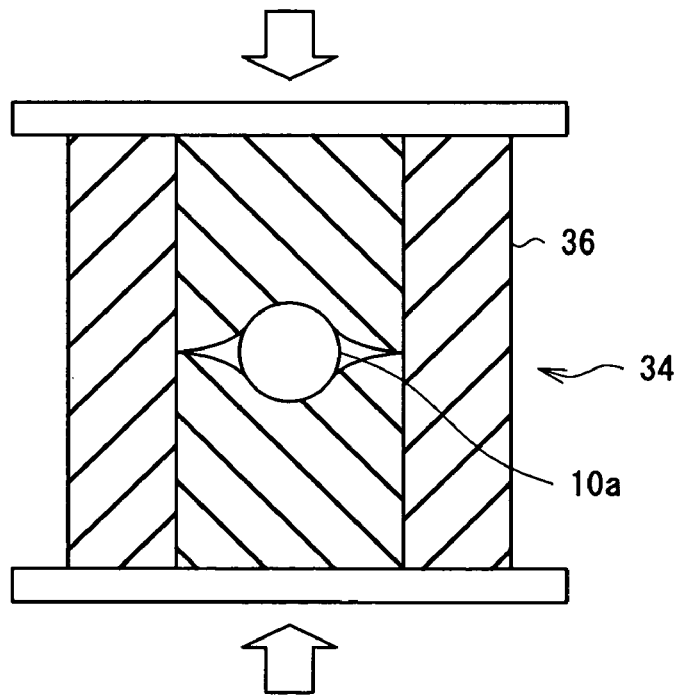
FIG. 21 shows a case where the modified example of the discharge tube connector according to the sixth embodiment is pressed and corresponds to FIG. 19.

In this embodiment, a contact surface of the conductive connection portion 33 to contact with the end electrode 10a is a flat rectangular surface. However, as shown in FIG. 20, conductive contact surfaces 35a and 35c, each of whose cross section shape is an elliptical arc shape, can be provided to produce a discharge tube connector 34 having a gap V2 with an elliptical shape whose minor axis corresponds to the conductive connection direction. In this embodiment, a space into which the end electrode 10a is inserted has a cylindrical shape whose bottom surface is elliptical. An outer circumferential surface 36c of an engaging surface portion 36 of a holding portion 34a has substantially the same shape as the engaging surface portion 32 of the discharge tube connector 31 according to the sixth embodiment. According to such a structure, as shown in FIG. 21, when pressing protrusions 36a protruding from the outer circumferential surface 36c are pressed in the conductive connection direction, two conductive contact surfaces 35a and 35b of the conductive connection portion 35 can be brought into contact with each other and an expansion deformation of the engaging surface portion 36 to the outside can be reduced.

Figure 22:
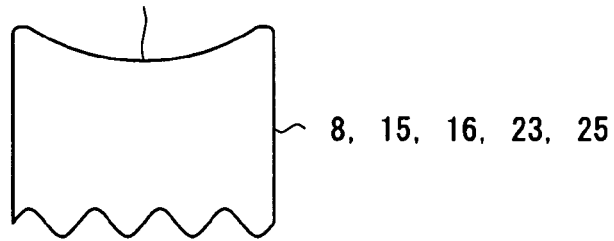
FIG. 22 is a cross sectional view showing a conductive connection portion common to the respective embodiments.

Modified Examples of Respective Embodiments: In the respective embodiments of the present invention, each of the conductive contact surfaces 8a, 15a, 23a, 25a, and 16a of the conductive connection portion 16 and the conductive connection portions 8, 15, 23, and 25 are described as the flat surface. However, as shown in FIG. 22, each of the conductive contact surfaces 8a, 15a, 16a, 23a, and 25a of the conductive connection portions 8, 15, 16, 23, and 25 is preferably provided in a concave curved shape such that the shape of each thereof is matched with outer shapes of the end electrodes 10a and 17a and an outer shape of the reflecting plate. According to such a structure, a contact area between the conductive contact surface 8a, 15a, 16a, 23a, or 25a and an electrode such as the end electrode 10a or 17a or the reflecting plate can be increased, so the conductivity of the conductive connection portion 8, 15, 16, 23, or 25 can be improved.

A rubber-like elastic material into which the conductive materials 11 are uniformly dispersed can be used for the conductive connection portions 8, 15, 16, 23, 25, 29, and 33. For example, a conductive rubber in which conductive carbons are mixed and kneaded to disperse into a rubber-like material can be also used. Alternatively, it is possible to use a columnar rubber-like elastic material whose surface is coated with a conductive coating film or a rubber-like elastic material including an elastic material such as a spring made of metal. The conductive connection portion 8, 15, 16, 23, 25, 29, or 33 in which conductive materials included in a rubber-like elastic material are connected in chain in the conductive connection direction can be produced in advance. Therefore, when the discharge tube connector 6, 12, 18, 21, 24, or 31 is to be manufactured, the conductive connection portion 8, 15, 16, 23, 25, 29, or 33 is preferably inserted into a mold for forming the discharge tube connector 6, 12, 18, 21, 24, or 31. Thus, the mold structure can be simplified.

For modifications, the coupling portion 14 can be provided to each of the discharge tube connectors 6, 21, 24, and 31 according to the first, fourth, fifth, and sixth embodiments and the coupling portion 14 can be removed from the discharge tube connector 12 according to the second embodiment and the discharge tube connector 18 according to the third embodiment. The pressing protrusions 22e of the fourth embodiment can also be employed for the discharge tube connector 12 according to the second embodiment.

Figure 23:
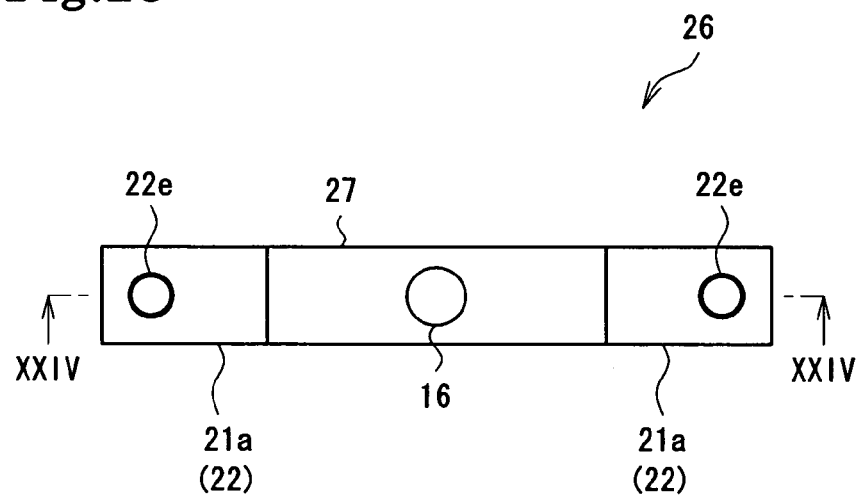
FIG. 23 is a plan view showing a modified example of the discharge tube connector according to the fourth embodiment of the present invention.
Figure 24:
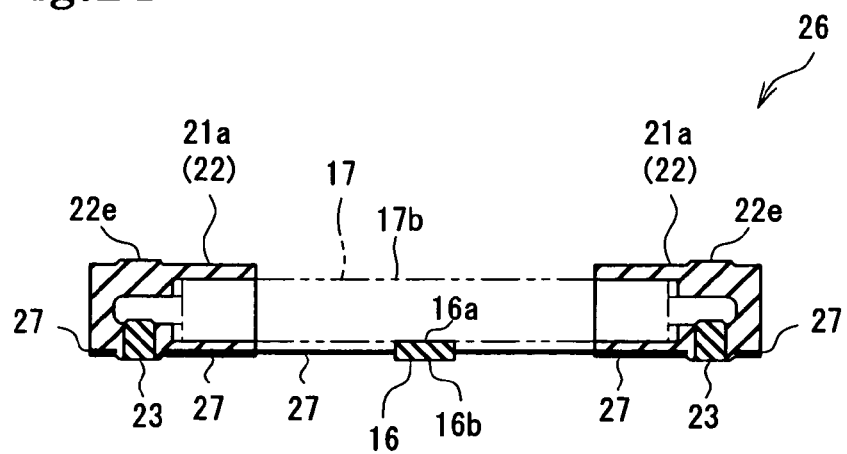
FIG. 24 is a cross sectional view along the line XXIV-XXIV of FIG. 23.
Figure 25:
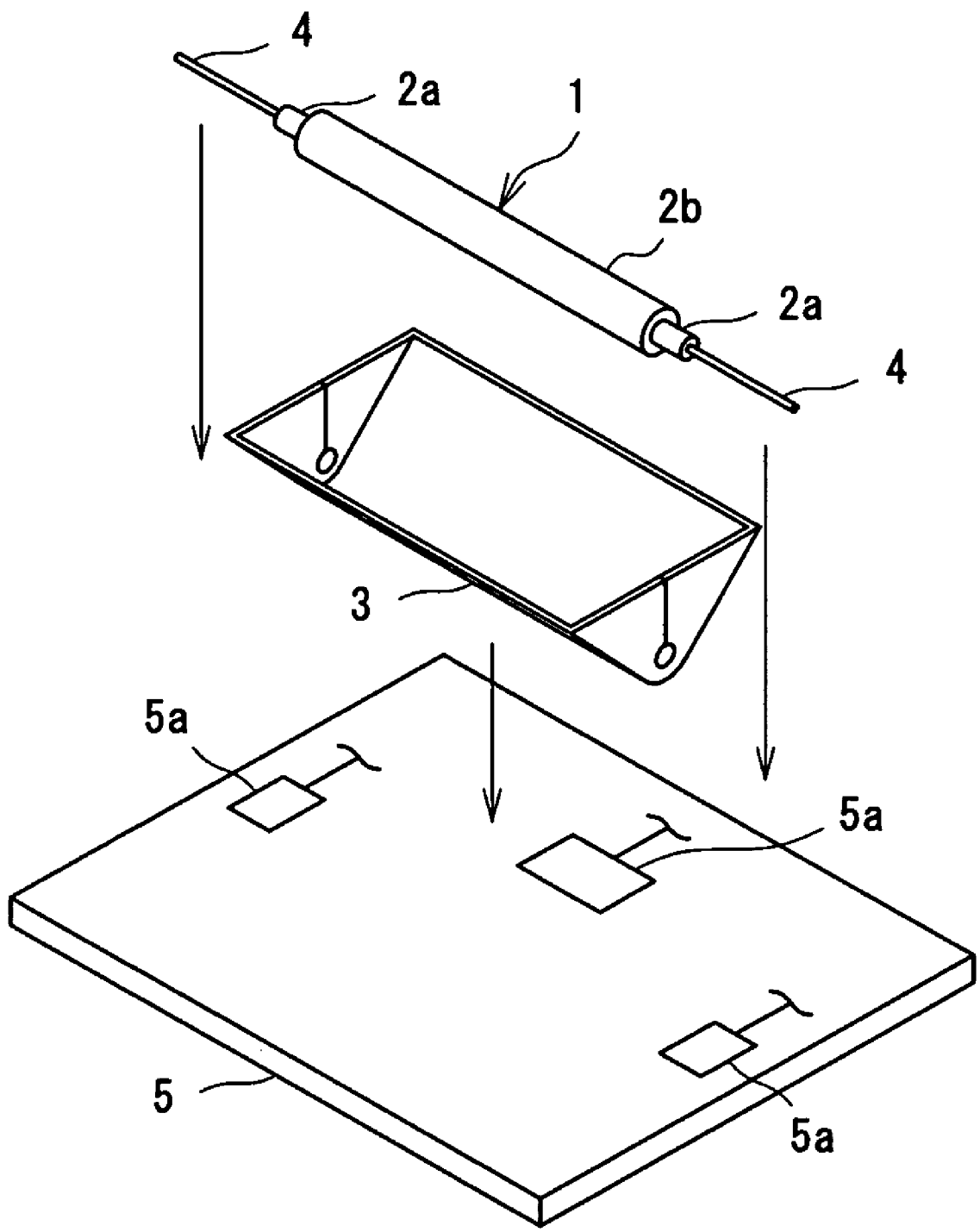
FIG. 25 is an exploded perspective view showing an example of a conventional flash device.

The coupling portion 14 provided for the discharge tube connector 6 according to the second embodiment and the discharge tube connector 18 according to the third embodiment is made of the rubber-like elastic material. However, the coupling portion 14 can be made of a resin film. In the case of such a discharge tube connector, when a resin film for a coupling portion is inserted into a mold for forming the discharge tube connector and a liquid resin composition for the holding portions 12a and 18a is injected thereinto, the coupling portion and the holding portions can be integrally formed. FIGS. 23 and 24 show a discharge tube connector 26 in which the holding portions 21a described in the fourth embodiment are coupled to each other through a coupling portion 27 made of the resin film. FIG. 23 is a plan view showing the discharge tube connector 26. FIG. 24 is a cross sectional view along the line XXVI-XXVI of FIG. 23. The resin film is used for the coupling portion 27, so a thickness of the resin film in the thickness direction thereof can be reduced as compared with the coupling portion 14 using the rubber-like elastic material. Therefore, the discharge tube connector 26 can be thinned. Furthermore, each of the coupling portions 14 and 27 can be made of a metal thin plate. When the metal thin plate is used, the shape of the discharge tube connector can be maintained as in a case where the resin plate is used. Thus, for example, an alignment at the time of installation to the circuit board is easily performed. Note that, when the metal thin plate is used, it is necessary to perform insulation processing so as to prevent conductive connection with the conductive connection portion 8, 15, 16, 23, 25, 29, or 33 or to prevent conductive connection even in the case of contacting a peripheral member.

What is claimed is:

1. A discharge tube connector mounted to a discharge tube including a light-emitting portion and an end electrode extending from an end portion of the light-emitting portion, for connecting the end electrode with a board electrode of a circuit board, comprising
    a holding portion mounted to a first end portion of the discharge tube,
    wherein the holding portion includes a conductive connection portion for conductively connecting the end electrode with the board electrode and an engaging surface portion to be engaged with an outer circumferential surface of the light-emitting portion of the discharge tube,
    wherein the engaging surface portion has at least one arm-shaped holding claw portion having an arc-shaped cross section which holds the light-emitting portion of the discharge tube so as to at least partially surround the light-emitting portion.

2. A discharge tube connector according to claim 1, wherein the holding portion comprises a molding of a rubber-like elastic material.

3. A discharge tube connector according to claim 1, wherein the conductive connection portion comprises a conductive material in which magnetic conductive materials are aligned in a conductive connection direction.

4. A discharge tube connector according to claim 1, wherein the conductive connection portion includes a contact surface to contact with the end electrode which is provided to protrude higher than a surface around the conductive connection portion.

5. A discharge tube connector according to claim 1, wherein the holding portion comprises a pressing protrusion for increasing a contact pressure between the conductive connection portion and the end electrode in a conductive connection direction,
    wherein the pressing protrusion is formed integrally with the engaging surface portion and the pressing protrusion is formed protruded outwardly from an outer circumferential surface of the engaging surface portion.

6. A discharge tube connector according to claim 1, wherein the holding portion comprises an engaging surface portion to be engaged with the end electrode of the discharge tube.

7. A discharge tube connector according to claim 1, further comprising:
    a holding portion mounted to a second end portion of the discharge tube; and
    a coupling portion extending in a longitudinal direction of the discharge tube, for connecting the holding portion mounted to the first end portion to the holding portion mounted to the second end portion.

8. A discharge tube connector according to claim 1, wherein the holding portion comprises a mounting portion for a reflecting plate for reflecting light from the light-emitting portion.

9. A discharge tube connector according to claim 6, wherein the engaging surface portion has a bottomed cylindrical shape.

10. A discharge tube connector according to claim 7, wherein the coupling portion comprises a conductive connection portion for conductively connecting a trigger electrode provided to the light-emitting portion of the discharge tube with another substrate electrode of the circuit board.

11. A discharge tube connector according to claim 7, wherein the holding portion and the coupling portion are integrally formed of a rubber-like elastic material.

12. A discharge tube connector according to claim 7, wherein:
    the holding portion comprises a rubber-like elastic material;
    the coupling portion comprises a resin film; and
    the holding portion and the coupling portion are integrally formed.

13. The discharge tube connector according to claim 1, wherein at least one arm-shaped claw portion is two claws opposed to each other, having a substantially C-shaped cross section which holds the light-emitting portion of the discharge tube so as to suffound the light-emitting portion.

14. The discharge tube connector according to claim 4, wherein the contact surface of the conductive connection portion has a single flat surface to contact with the end electrode.

15. A discharge tube connector mounted to a discharge tube including a light-emitting portion and an end electrode extending from an end portion of the light-emitting portion, for connecting the end electrode with a board electrode of a circuit board, comprising
    a holding portion mounted to a first end portion of the discharge tube,
    wherein the holding portion includes a conductive connection portion for conductively connecting the end electrode with the board electrode and an engaging surface portion to be engaged with an outer circumferential surface of the light-emitting portion of the discharge tube, and the engaging surface portion has a bottomed cylindrical shape.

16. A discharge tube connector according to claim 15, further comprising:
   a holding portion mounted to a second end portion of the discharge tube; and
   a coupling portion extending in a longitudinal direction of the discharge tube, for connecting the holding portion mounted to the first end portion to the holding portion mounted to the second end portion.

17. A discharge tube connector mounted to a discharge tube including a light-emitting portion and an end electrode extending from an end portion of the light-emitting portion, for connecting the end electrode with a board electrode of a circuit board, comprising
   a holding portion mounted to a first end portion of the discharge tube,
   wherein the holding portion includes a conductive connection portion for conductively connecting the end electrode with the board electrode and an engaging surface portion to be engaged with the end electrode of the discharge tube,
   wherein the conductive connection portion comprises a contact surface with the end electrode which is exposed on an engaging surface of the engaging surface portion.

18. A discharge tube connector according to claim 17, further comprising:
   a holding portion mounted to a second end portion of the discharge tube; and
   a coupling portion extending in a longitudinal direction of the discharge tube, for connecting the holding portion mounted to the first end portion to the holding portion mounted to the second end portion.

19. A discharge tube connector mounted to a discharge tube including a light-emitting portion and an end electrode extending from an end portion of the light-emitting portion, for connecting the end electrode with a board electrode of a circuit board, comprising
   a holding portion mounted to a first end portion of the discharge tube,
   wherein the holding portion includes a conductive connection portion for conductively connecting the end electrode with the board electrode and an engaging surface portion to be engaged with the end electrode of the discharge tube,
   the engaging surface portion has a bottomed cylindrical shape,
   the conductive connection portion is provided to extend though an engaging surface portion to be engaged with the end electrode in a conductive connection direction; and
   the conductive connection portion comprises end portions exposed on an outer circumferential surface located on both sides of the engaging surface portion.

20. A discharge tube connector according to claim 19, wherein:
   the conductive connection portion comprises two contact surfaces to contact with the end electrode of the discharge tube, which are formed with a width larger than a diameter of the end electrode; and
   the two contact surfaces can be in contact with each other at a vicinity of the end electrode when a pressing protrusion is pressed.

21. A discharge tube connector according to claim 19, further comprising:
   a holding portion mounted to a second end portion of the discharge tube; and
   a coupling portion extending in a longitudinal direction of the discharge tube, for connecting the holding portion mounted to the first end portion to the holding portion mounted to the second end portion.

* * * * *